United States Patent [19]

Sato et al.

[11] 4,072,071

[45] Feb. 7, 1968

[54] MECHANICAL-HYDRAULIC RADIAL FEED SYSTEM FOR A LATHE

[75] Inventors: Yukio Sato; Takeshi Itoh, both of Shizuoka; Hiromi Izawa, Shimizu, all of Japan

[73] Assignee: Star Seimitsu Kabushiki Kaisha, Japan

[21] Appl. No.: 710,114

[22] Filed: July 30, 1976

[30] Foreign Application Priority Data

Aug. 6, 1975 Japan .................................. 50-95008

[51] Int. Cl.² ......................... B23B 3/00; B23B 21/00
[52] U.S. Cl. ...................................... 82/2 R; 82/21 A
[58] Field of Search ............ 82/2 R, 2 A, 21 R, 21 A, 82/25; 29/37 A

[56] References Cited

U.S. PATENT DOCUMENTS

| | | | |
|---|---|---|---|
| 3,245,290 | 4/1966 | Johansson | 82/21 A |
| 3,308,693 | 3/1967 | Bechler | 82/2 R |
| 3,715,939 | 2/1973 | Leschenne | 82/21 A |
| 3,811,346 | 5/1974 | Nomura | 82/25 |

*Primary Examiner*—Harrison L. Hinson
*Attorney, Agent, or Firm*—Robert E. Burns; Emmanuel J. Lobato; Bruce L. Adams

[57] ABSTRACT

A mechanical-hydraulic radial feed system for a lathe for selectively operating a selected number of tool slides in the radial direction with respect to a workpiece in the form of wire or rod which is carried by a headstock for rotation and axial movement. Each of the tool slides is normally maintained in its inoperative position and is driven toward its maximum advanced position upon energization of an associated hydraulic cylinder unit. The rate and magnitude of feed applied to the respective tool slide is profile controlled by a cam member adapted for angular motion about the axis of the workpiece and which has a cam surface operatively engaged by an arm extending from each tool slide.

9 Claims, 7 Drawing Figures

MECHANICAL-HYDRAULIC RADIAL FEED SYSTEM FOR A LATHE

FIELD AND BACKGROUND OF THE INVENTION

The invention relates to lathes, and more particularly, to a mechanical-hydraulic radial feed system for a lathe having a plurality of tools which can be selectively operated in the radial direction to cut a workpiece in the form of wire or rod which is carried by a headstock for rotation and axial movement therewith.

In known lathes there are provided a plurality of tool slides capable of movement in the radial direction of the workpiece and which are operated by corresponding profile cams mounted on a common control shaft and which in turn act through strongly spring biased lever mechanisms. In automatic lathes, lever mechanisms having different lengths constitute the path for transmission of force from the associated cams to the respective tool slides, so that the transmission loss resulting from the rigidity of levers and the joint between the levers as well as the relative magnitude of such loss are of a great consequence. An automatic lathe having an increased length of the transmission path is inadequate for a high precision machining, and additionally presents inconveniences because of varying machining precision associated with different tool slides. The preparation of a plurality of cams applicable to the respective tool slides and their positioning in predetermined orientations on the common control shaft also represent a troublesome operation.

The above described disadvantages can be overcome in part by driving the tool slides with corresponding hydraulic cylinder units. A construction of this type is disclosed in Japanese Patent Publication No. 15,356/1970 which is based on its counterpart application in West Germany filed Dec. 21, 1965. In the disclosed arrangement, each tool slide is connected with a piston rod of an associated hydraulic cylinder unit, so that the path of transmission mentioned above can be minimized. However, the motion of the tool slides is controlled by a switching of control valves which are connected between the cylinder units and a pump. As a result, in contrast to the forced drive transmitted through the lever mechanisms mentioned above, alignment with the cams is not assured. In addition, a variation in the consistency of the working fluid resulting from temperature changes gives rise to a deviation, requiring resort to a manual adjustment of screw stops in determining the amount of feed.

SUMMARY OF THE INVENTION

It is an object of the invention to provide a mechanical-hydraulic feed system for a lathe which eliminates the above disadvantages of the prior art by an arrangement which permits a selective control of all of the tool slides by a single cam member and which minimizes the path length of force transmission between the cam member and the tool slides.

According to the invention, the above object is achieved by providing a single cam member adapted for angular movement about the axis of a workpiece and by providing a selective drive to a selected number of tool slides each holding a tool and movable radially of the workpiece between an inoperative position and a maximum advanced position, through an operative connection between the cam member and the tool slides so that the movement of the tool slides is profile controlled in accordance with the cam surface of the cam member. In a preferred embodiment of the invention, the operative connection between the cam member and the tool slides is accomplished by an arm extending from each tool slide toward the cam member in parallel relationship with the axis of the workpiece. One hydraulic cylinder unit is associated with each tool slide and forcibly urges the arm against the cam member, thus advancing or retracting the tool slide by a predetermined amount of feed in accordance with the cam profile as the cam member moves angularly. The hydraulic cylinder unit may be connected with either the arm or the tool slide. A particular tool slide is selected by energizing the associated hydraulic cylinder unit from one or inoperative end position toward the other end position, which can be easily accomplished through a hydraulic control. In this manner, the hydraulic cylinder unit supplies sufficient radial cutting force to the tool slide.

The cam member, with which the tool slides are selectively brought into an operatively connected relationship, may fundamentally take either one of two forms. In one form, it includes an independent cam surface for each tool slide, and the cam surface can be operatively connected with a corresponding tool slide. With the cam member of this form, a simultaneous control of more than one tool slides is possible, thereby permitting a rough and a finish cutting simultaneously by a pair of selected tool slides. In the other form, the cam member includes a single elongate, continuous cam surface which is common to the selected number of tool slides. This cam member can only be operatively connected with a selected tool slide, and hence a simultaneous control of more than one tool slides is no longer possible. However, the elongate, continuous cam surface enables a control of a selected tool slide with a high accuracy. In addition to the two forms mentioned above, the invention also contemplates the use of a cam member of an intermediate form between the described forms. In either instant, the cam surface may be formed with a uniform pitch in which the radius of the cam profile varies in direct proportion to the angle of rotation, and the cam member may be driven by an electric motor which is energized by a numerical control system.

It should be also understood that the invention is equally applicable to an automatic lathe in which the workpiece is only subject to a rotary motion from the headstock without accompanying an axial movement.

In another embodiment of the invention, there is provided a second cam member which is coaxial with the first mentioned cam member. A plurality of tool slides are divided into two groups, a tool slide in one group being adapted to be selectively brought into operative association with the first cam member and a tool slide in the other group being adapted to be selectively brought into operative association with the second cam member. One of the cam members which are located remote from the tool slides has a greater diameter than the other so that arms which are to be operatively connected with the one cam member do not interfere with the other cam member. Two control schemes are possible with such a mechanical-hydraulic radial feed system for a lathe. In one scheme, the respective cam members are driven for angular movement by separate drive means, while in the other, they may be mounted on a common shaft to be driven by single drive means. Whatever scheme may be employed, the system according to the invention permits a pair of tool slide, one each from the individual groups, to be operated at different timings, thus enabling an efficient alternation of one tool slide in its return mode while the other tool slide is in its machining mode and vice versa. Alternatively, a pair of tool slides may be simultaneously maintained in their machining mode while permitting one or the other of them to be returned earlier.

To summarize, the mechanical-hydraulic radial feed system according to the invention comprises a headstock for holding a workpiece in the form of wire or rod for rotation, a frame, a plurality of tool slides slidably mounted in the frame and movable radially of the workpiece between an inoperative position and a maximum advanced position, a plurality of hydraulic cylinder units each associated with one of the tool slides for driving the tool slides from the inoperative position toward the maximum advanced position, a hydraulic circuit for controlling the hydraulic cylinder units, a cam member adapted for angular movement about the axis of the workpiece, means for driving the cam member, and connection means normally isolating the tool slides from the cam member, but responsive to an actuation of a particular hydraulic cylinder unit for operatively connecting the associated tool slide with the cam member to profile control the motion of said tool slide in accordance with the cam member under the drive from the particular hydraulic cylinder unit.

In accordance with the invention, the motion of a selected tool slide or slides is forcibly brought into coincidence with the motion of the cam member, and hence the amount of feed can be numerically controlled through the angle of rotation of the cam member. The path of transmission of force between the tool slides and the cylinder units can be made uniform and minimized, thereby enabling a high efficiency production of high accuracy articles in an automatic lathe. Additional features of the invention are found in the simplicity of construction and the ease of assembly and adjustment.

DETAILED DESCRIPTION OF PREFERRED EMBODIMENT

Figure 1:
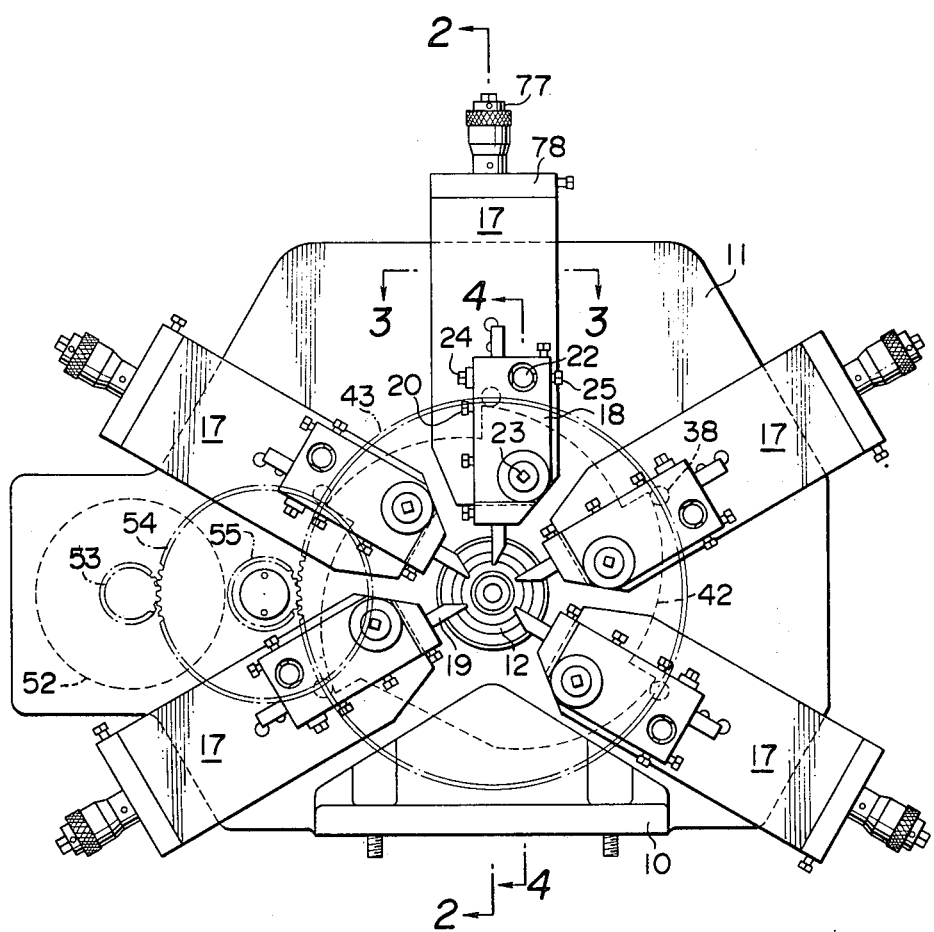
FIG. 1 is a side elevation of the mechanical-hydraulic radial feed system for a lathe according to the invention, as viewed in the axial direction of the workpiece.

FIG. 1 shows the essential part of a mechanical-hydraulic radial feed system for a lathe according to the invention which is mounted on a machine table, not shown. The lathe on which the system is used includes a bed 10 from which extends a rigid vertical frame 11, which is integral therewith. A support bushing 12 is fixedly mounted in an opening 16 which is formed in the frame 11. Since a support bushing is well known in the art, it is not shown in detail. However, the support bushing 12 used in the present invention may be either of the type which is in sliding contact with a workpiece 13 or the type which rotates with the workpiece 13. As will be clear from FIG. 2, the workpiece 13 is held by a headstock 14 of a lathe which includes a chuck 15, and is adapted to be driven by the headstock 14 for rotation and axial movement. A feed arrangement incorporating such a headstock is also well known in the art, and in the embodiment, it is arranged on the back side of the vertical frame 11. Instead of providing the support bushing 12, the arrangement shown may be modified by advancing the location of the chuck 15 into the opening 16, together with the headstock 14.

Figure 3:
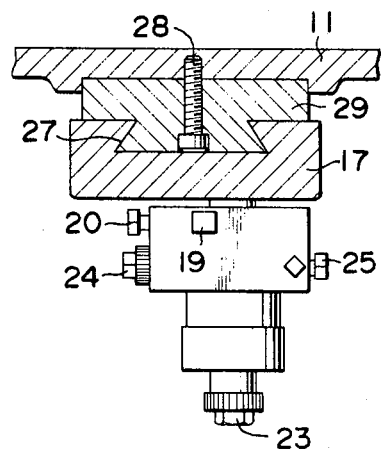
FIG. 3 is an enlarged cross section taken along the line 3—3 shown in FIG. 1.
Figure 4:
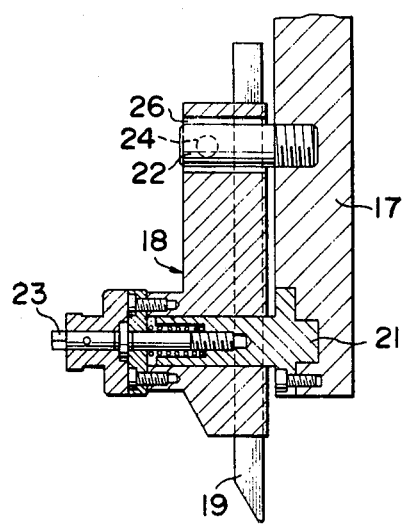
FIG. 4 is an enlarged cross section taken along section line 4—4 shown in FIG. 1.

A plurality of tool slides 17, which are five in the example shown, are slidably mounted on the front surface of the vertical frame 11 so as to be movable in the radial direction of the workpiece 13. Each tool slide 17 has an identical construction, and the slides are distributed in a single vertical plane. Each tool slide 17 has a tool holder 18 mounted thereon, on which a tool 19 is firmly held by set screws 20 so as to be at a given spacing from the workpiece 13 when the slide 17 is in its inoperative position. In order to hold the tool 19 in a given orientation, the tool holder 18 is adjustable with respect to the tool slide 17. More specifically, referring to FIG. 4, the holder 18 is mounted on a pair of stems 21, 22 which are secured to the slide 17. A screw 23 threadably engaging the holder 18 in turn threadably engages a threaded bore in the stem 21, thus making the holder 18 adjustable lengthwise of the stem 21. A pair of screws 24, 25 (see FIGS. 1, 3 and 4) threadably engage the holder 18 through the opposite walls and have their inner end in abutting relationship against the opposite sides of the stem 22 which extends through a transverse bore 26 in the holder 18, thus making it adjustable in a direction along a line which joins the screws 24, 25. In this manner, the holder 18 enables the tool 19 to be movable in the radial direction of the workpiece 13 in a vertical plane. Once the adjustment is made during the assembly, the orientation is maintained for a prolonged period of use.

Each tool slide 17 is formed with a dovetail groove 27 (see FIG. 3) which extends radially of the workpiece 13, and a dovetail guide 29, secured to the front face of the vertical frame 11 by means of a threaded bolt 28, slidably engages the groove 27, whereby the tool slide 17 is movable between its inoperative position and its maximum advanced position. The guide 29 is formed with a relatively large slot 30, which communicates with a slot 31 formed in the vertical frame 11. The tool slide 17 carries an arm 32 extending in a direction parallel to the length of the workpiece 13 to the opposite side of the vertical frame 11 and which has a flange 33 which is in turn firmly attached to the slide 17 by means of threaded bolts 34. The arm 32 is made of a material having a high rigidity, and carries a roller 38 at its end which is pivotally connected, through a bearing, with a forked end 37 of a piston rod 36 received in a hydraulic cylinder unit 35. The cylinder unit 35 has a first and a second port 40, 41, and when a hydraulic pressure is supplied through the port 40 while a hydraulic pressure is released through the port 41, the piston rod 36 is driven to its lowermost position, as viewed in FIG. 2. At this time, the piston rod 36 acts through the arm 32 to drive the tool slide 17 to its maximum advanced position, which is lowermost as viewed in FIG. 2.

When the hydraulic pressure is released through the first port 40 and simultaneously the hydraulic pressure is supplied through the second port 41, the reverse is true. Thus the piston rod 36 is driven to its uppermost position as viewed in FIG. 2, and in turn drives the tool slide 17 to its inoperative or uppermost position. The control of movement of the piston rod 36 between these two extreme positions will be more fully described later with reference to FIG. 7.

Figure 2:
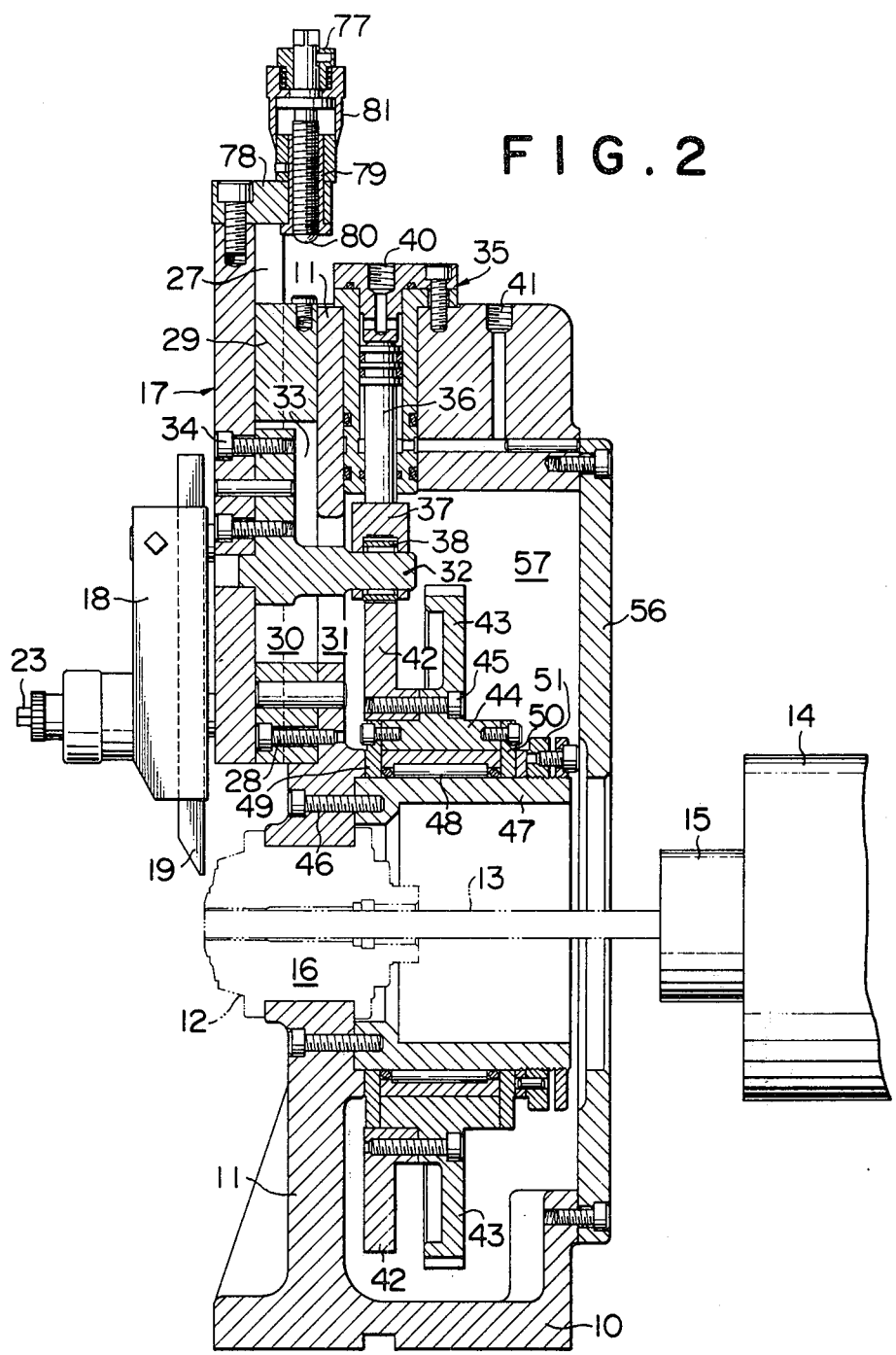
FIG. 2 is an enlarged cross section taken along section line 2—2 shown in FIG. 1.

In accordance with the invention, the movement of the tool slide 17 between its inoperative and its maximum advanced position is controlled by an operative connection of the free end of the arm 32, or more exactly, the roller 38 which functions as a cam follower, with a cam member 42 which is mounted for angular movement about the axis of the workpiece 13. In this manner, the movement of the tool slide 17 is controlled in a variable manner in accordance with the cam profile of the member 42. More specifically, the cam member 42 is firmly mounted on the boss 44 of a coaxial main gear 43 by means of threaded bolts 45, and the gear 43 is rotatably mounted by needle bearing 48 on a bracket 47 which is secured to the vertical frame 11 by threaded bolts 46. A pair of thrust metal pieces 49, 50 are fixedly attached to the opposite end faces of the boss 44, and the thrust piece 49 is maintained in sliding engagement with the vertical frame 11 while the other thrust piece 50 is maintained in sliding engagement with a thrust abutment 51 which is threadably fastened to the bracket 47. In this manner, it is assured that the main gear 43 and the cam member 42 remain in predetermined vertical planes. As shown in phantom lines in FIG. 1, the main gear 43 is adapted to be driven by an electric motor 52. Specifically, a small intermediate gear 53 is mounted on the motor shaft and meshes with another intermediate gear 54 of a greater diameter, and a further intermediate gear of a reduced diameter which is mounted on the same shaft as the gear 54 meshes with the main gear 43. While these intermediate gears 53 to 55 are not shown in detail, they are arranged in a housing 57 which is defined by the vertical frame 11 and a rearwardly spaced wall 56 (FIG. 2). The motor 52 may be mounted on the wall 56, and any suitable servo motor or pulse motor may be used which lend itself to a numerical control.

Figure 5:
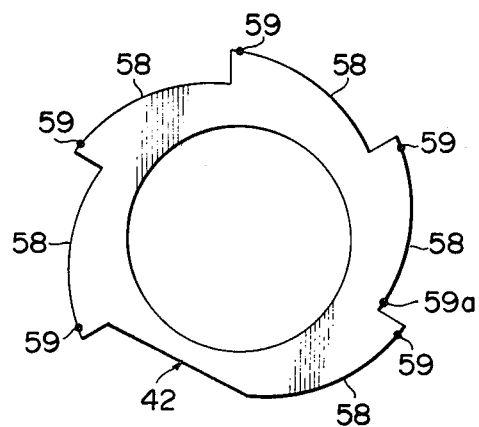
FIG. 5 is a front view of the cam member shown in FIG. 1.

FIG. 5 shows one form of the cam member 42. In the example shown, the member 42 has a total of five cam surfaces 58 along its periphery, each associated with one of the tool slides 17. Each cam surface 58 has a uniform or approximately uniform pitch, and has a starting point 59 defined adjacent to its end having the maximum diameter. At the commencement of a machining cycle, the cam member 42 assumes the angular position shown in phantom lines in FIG. 1. Thus the piston rod 36 and hence the tool slide 17 are in their uppermost or inoperative position, where the starting point 59 on the cam surface 58 is just in position to engage the roller 38 on the free end of the arm 32 extending from the corresponding tool slide 17. Means are known which electrically detects the starting point 59 to control the motor 52 so that an initial position for the cam member 42 may be established. By utilizing numerical control, it can be automatically returned to the initial position in preparation to subsequent machining cycles.

Only the cylinder unit 35 corresponding to the selected tool slide 17 may be operated to forcibly bring the roller 38 on the arm 32 of that tool slide 17 into contact with the cam member 42 located in its initial position. The cam member 42 is then driven for angular movement (counter-clockwise as viewed in FIG. 1) through a given angle. In order to assure the roller 38 to follow the cam surface 58 as it moves angularly, the cylinder unit 35 is energized with a sufficient hydraulic pressure to maintain the roller 38 in abutment against the cam surface, thus driving the tool slide 17. The rate and the amount of feed can be controlled by the corresponding cam surface 58. Since the cam surface 58 has a uniform pitch, the amount of feed is directly proportional to the angle of rotation of the cam member 42. To return the cam member 42 to its initial condition, it must be driven in the opposite direction while simultaneously energizing the cylinder unit 35 in the opposite sense, i.e. so as to drive the piston rod 36 to its lowermost position. When the cam member 42 and cooperating members operate in this sequence, a radial cutting force of sufficient magnitude is transmitted to a selected tool through the associated tool slide 17 to cut the outer surface of the workpiece 13. It is known that the workpiece can be machined to a variety of profiles or configurations in this mode by a combination of the axial movement of the workpiece 13 and the radial movement of the tool slide 17.

However, according to the invention, a cutting force can be applied in the radially opposite direction, which may be desirable when machining the internal surface of a hollow workpiece with a special angled tool, which may be held by one of the tool slides on the lathe. The cam surface 58 which is associated with a particular tool slide 17 carrying the internal cutting tool has a starting point 59a defined adjacent to a point thereon which has the minimum diameter. In preparation to the internal cutting, the cylinder unit 35 associated with the particular tool slide 17 is hydraulically energized so that the roller 38 comes into contact with the cam surface 58 at the starting point 59a. At this time, other tool slides 17 are held in their inoperative position by the associated hydraulic cylinder units. When the particular tool slide 17 reaches a predetermined position where its operation is to be initiated, the hollow workpiece is fed axially into confronting relationship with the tool 19. For purpose of machining, the cam member 42 is driven in the opposite direction from the direction in which it is driven when machining the external surface of the workpiece. As the roller 38 follows the cam surface 58, the arm 32 causes the tool 19 to be moved radially into engagement with the internal surface of the hollow workpiece. At this time, the hydraulic cylinder unit 35 urges the roller 38 against the cam surface 58 with a reduced force as compared with that applied thereto from the cam member 42. Upon termination of the internal cutting, it is necessary to retract the workpiece 13 axially out of alignment with the tool before the tool slide 17 can be returned to its inoperative position.

Figure 7:
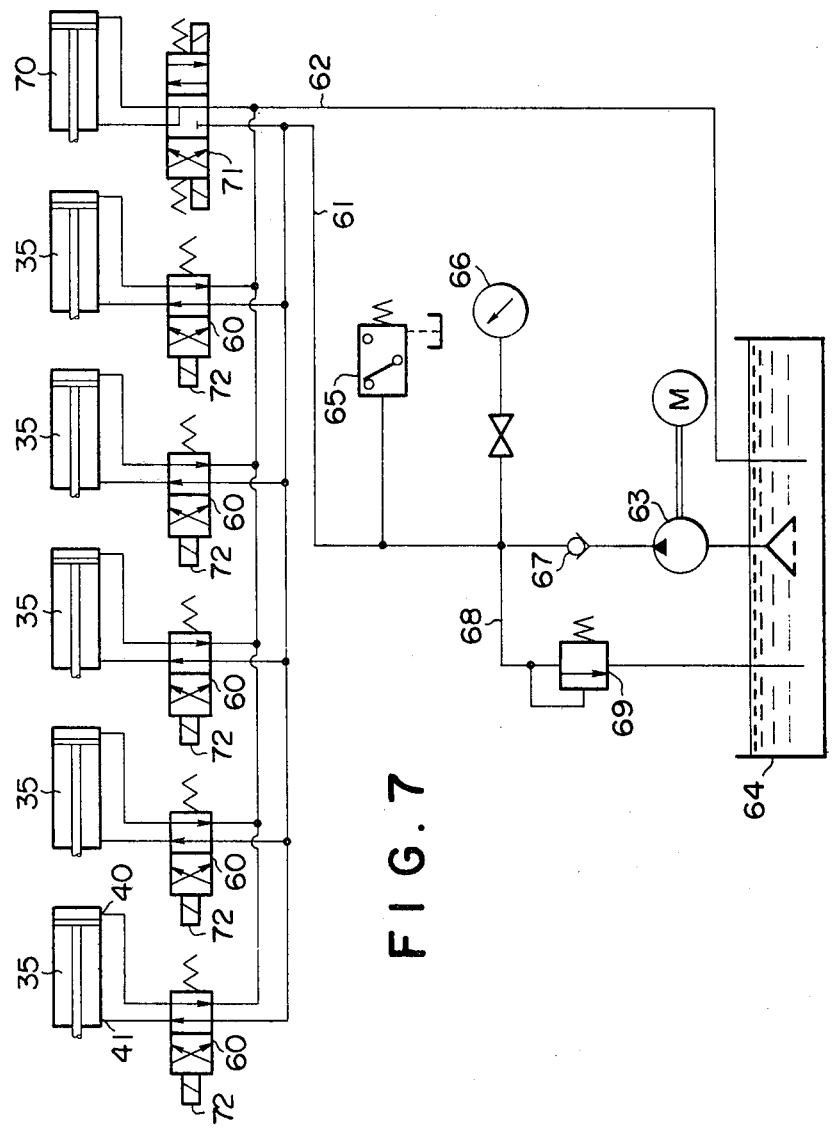
FIG. 7 is a schematic diagram of a hydraulic circuit which may be used in the mechanical-hydraulic feed system of FIG. 1.

With the cam member 42 shown in FIG. 5 which has each cam surface 58 associated with individual tool slides 17 that are mounted on the lathe, more than one of the tool slides can be operated simultaneously. At this end, the size and arrangement of the tool slides 17 are such that they do not interfere with each other within the intended area to be machined, and there is provided a hydraulic circuit which permits an independent operation of the individual cylinder units 35. The hydraulic circuit is shown in FIG. 7 where it will be seen that the first and the second port 40, 41 of the respective cylinder units 35 are connected in shunt through individual switching valves 60 to a pair of pressure and drain lines 61, 62, across which is connected a pump 63. Specifically, the pump 63 has its inlet opening disposed within a fluid tank 64, to which the drain line 62 discharges. The pressure line 61 is connected with a pressure-operated switch 65 which detects a reduction in the pressure and also with a pressure gauge 66 which indicates the pressure in the line 61. A check valve 67 is connected in the line 61, and has its load side connected with a conduit 68 which returns to the tank 64 through a relief valve 69. Also connected with the pressure line 61 and the drain line 62 is a three way switching valve 71 which is associated with a hydraulic cylinder 70 controlling the operation of the chuck 15. Each of the switching valves 60 is formed by a solenoid-operated valve having a solenoid 72 which may be selectively energized or deenergized in response to a command signal from a numerical control system, not shown, thus driving the cylinder unit or units in one direction or the other. It is to be noted that the command signal may be applied to more than one solenoids 72 simultaneously.

While more than one tool slides 17 may be simultaneously operatively connected with the cam member 42 in the automatic lathe of the invention, it results in the application of drive torques from more than one cylinder units 35 to the cam member 42 simultaneously, which may give rise to a component of rotation to be imparted to the cam member or a change in the momenta of inertial of the cam member 42. However, such influence remains to be negligible inasmuch as the motor 52 which drives the cam member 42 can be braked electrically and the cam surfaces 58 may be made gentle enough to avoid the occurrence of any significant rotating component as a result of the drive torques applied by the cylinder units 35. As a roller 38 on a selected tool slide 17 is urged by the associated cylinder unit 35 into forced abutment against a corresponding cam surface 58, there occurs a pressure rise in such cylinder unit 35. In the event of an abnormal pressure rise, the relief valve 69 operates to release the excessive pressure, thereby protecting the hydraulic system.

Figure 6:
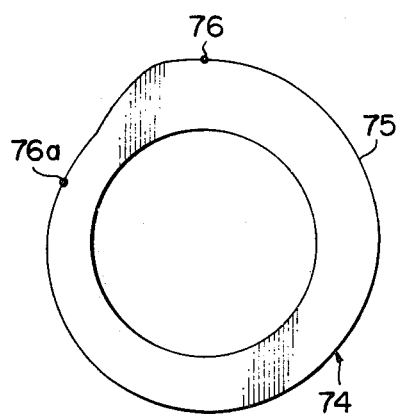
FIG. 6 is a front view of an alternative cam member which may be substituted for the cam member of FIG. 5 in the lathe shown in FIG. 1.

FIG. 6 shows another cam member 74 which may be substituted for the cam member 42 of FIG. 5 in the automatic system according to the invention. The cam member 74 has a single elongate, continuous cam surface 75 of a uniform pitch around its periphery. The cam surface 75 may have either one or both of starting points 76, 76a, which are shown as located adjacent to points of a maximum and a minimum diameter. In use, either starting point 76 or 76a is initially engaged by a roller 38 on a selected tool slide 17. The choice of the starting point 76 or 76a depends on whether external or internal cutting is desired. The operation is similar to that described above in connection with the cam member 42 except that only one tool slide can be selected at any one time. The actuation of any selected hydraulic cylinder unit 35 is effected by the hydraulic circuit shown in FIG. 7 which operates the switching valve 60 by controlling the electrical energization of the solenoid 72. When a machining cycle with one tool slide 17 terminates and another machining cycle with another tool slide is initiated, the first tool slide is returned to its inoperative position by the associated cylinder unit while the cam member 74 is angularly moved to an initial position in which the desired cam surface 75 has its starting point located in alignment with the roller 38 on the new tool slide 17. Where the cam member 74 is used, the gentle curvature of the cam surface 75 enhances the machining accuracy.

In accordance with a further aspect of the invention, a feed adjustment screw 77 may be disposed in threaded engagement with a female thread member 79 which is secured to an outer end plate 78 of each tool slide 17. The screw 77 has a tip end 80 which is disposed in opposing relationship with the end of the guide 29 to serve as a stop, by inhibiting a further downward movement of the tool slide when the tip of the screw 77 bears against the guide. By turning the screw 77, the stop position is variable. The screw 77 carries a dial member 81 for indicating the stop position. While a similar stop arrangement is known, it has a distinguishing feature as mentioned below. In the automatic lathe of the invention, the tool slides 17 are numerically controlled, and hence their amount of feed is established automatically by a selected control program. However, because numerical control depends on a digital quantity or an incremental change, there may be certain instances requiring a close control of size tolerance where the required size of the workpiece lies between two increments. In these circumstances, the screw 77 may be utilized to provide an analogue adjustment. By way of example, if the required gauge of the workpiece is 4.999 mm, and the increment is 0.002 mm, the numerical control is programmed to permit the workpiece to be cut to a gauge of 4.998 mm, thus by 1/1,000 mm deeper than the design value. On the other hand, the screw 77 may be positioned so as to permit a cutting to the gauge of 4.999 mm. The tool slide 17 will come to a stop before the full value of feed programmed is reached. A pressure rise occurs in the circuit of the cylinder unit 35, but any abnormal pressure can be released by the relief valve 69. Subsequent to the stop of movement of the tool slide, the cam member continues to move angular under no load until the given stroke is reached.

While the invention has been specifically described herein in terms of a preferred embodiment thereof, it should be understood that it is illustrative only and not limitative of the invention, and that various modifications, changes and variations will readily occur to those skilled in the art without departing from the spirit and scope of the invention. For example, the member which provides an operative connection between the tool slides and the cam member as well as the configuration of the cam member are susceptible to variations. Therefore, it should be understood that the invention is solely defined by the appended claims.

Having described the invention, what is claimed is:

1. For use in a lathe having a headstock for holding a workpiece in the form of wire or rod for rotation a mechanical-hydraulic radial feed system comprising, a frame, a plurality of tool slides slidably mounted in the frame and in use movable radially of a rotationally and axially driven workpiece in a lathe, the slides each having means for carrying a tool, a plurality of hydraulic cylinder units each associated with a respective one of the tool slides for driving the tool slides from an inoperative position corresponding to a retracted position and toward the workpiece to a maximum advanced position and back to the inoperative position, a hydraulic circuit for controlling the hydraulic cylinder units, a profile cam member mounted for angular movement about an axis coincident with an axis of the workpiece, means for driving the cam member rotationally, connection means normally isolating the tool slides from the cam member, but responsive to an actuation of a particular hydraulic cylinder unit for operatively connecting the associated tool slide with the profile of the cam member to profile-control the radial motion of said tool slide in accordance with the profile of the cam member under the control of the particular hydraulic cylinder unit.

2. For use in a lathe having a headstock for holding a workpiece in the form of wire or rod for rotation a mechanical-hydraulic radial feed system according to claim 1 in which the headstock drives the workpiece for rotation and axial movement.

3. For use in a lathe having a headstock for holding a workpiece in the form of wire or rod for rotation a mechanical-hydraulic radial feed system according to claim 1 in which the cam member is peripherally formed with a plurality of independent cam surfaces each associated with one of the tool slides.

4. For use in a lathe having a headstock for holding a workpiece in the form of wire or rod for rotation a mechanical-hydraulic radial feed system according to claim 1 in which the cam member is peripherally formed with a cam surface which is common to all of the tool slides.

5. For use in a lathe having a headstock for holding a workpiece in the form of wire or rod for rotation a mechanical-hydraulic radial feed system according to claim 1 in which the connection means comprises a plurality of arms secured to the respective tool slides and extending toward the path of rotation of the profile of the cam member, the arm having its end operatively engaged with the cam member in response to the actuation of a particular hydraulic cylinder unit associated with the tool slide.

6. For use in a lathe having a headstock for holding a workpiece in the form of wire or rod for rotation a mechanical-hydraulic radial feed system according to claim 5 in which the hydraulic cylinder unit is connected with the arm and drives the tool slide through the arm.

7. For use in a lathe having a headstock for holding a workpiece in the form of wire or rod for rotation a mechanical-hydraulic radial feed system according to claim 1, further including a plurality of feed adjustment screws each carried by the respective tool slides, each said screw being bearing against the frame as the tool slide on which it is carried moves, thereby variably adjusting the maximum advanced position of the respective tool slides.

8. For use in a lathe having a headstock for holding a workpiece in the form of wire or rod for rotation a mechanical-hydraulic radial feed system according to claim 1 in which each of the hydraulic cylinder units comprises means for normally driving the associated tool slide to the inoperative position.

9. For use in a lathe having a headstock for holding a workpiece in the form of wire or rod for rotation a mechanicl-hydraulic radial feed system to claim 1 in which the means for driving the cam member comprises an electric motor associated with a numerical control.

* * * * *

UNITED STATES PATENT AND TRADEMARK OFFICE
CERTIFICATE OF CORRECTION

PATENT NO. : 4,072,071
DATED : February 7, 1978
INVENTOR(S) : SATO et al

It is certified that error appears in the above–identified patent and that said Letters Patent are hereby corrected as shown below:

In the Heading of the Patent, Item [45] change:

Feb. 7, 1968 to:

--Feb. 7, 1978--.

Signed and Sealed this

Twenty-seventh Day of June 1978

[SEAL]

Attest:

RUTH C. MASON
*Attesting Officer*

DONALD W. BANNER
*Commissioner of Patents and Trademarks*